United States Patent
Jakubowski et al.

(10) Patent No.: US 7,886,694 B2
(45) Date of Patent: Feb. 15, 2011

(54) PET BOOSTER SEAT

(75) Inventors: Scott S. Jakubowski, Castleton, VT (US); Todd M. Jakubowski, Rutland, VT (US); Chris Jakubowski, Rutland Town, VT (US); Wu Cheng-Lung, South of ZhongShan (CH)

(73) Assignee: Vermont Juvenile Furniture Mfg., Inc., West Rutland, VT (US)

( * ) Notice: Subject to any disclaimer, the term of this patent is extended or adjusted under 35 U.S.C. 154(b) by 299 days.

(21) Appl. No.: 12/029,071

(22) Filed: Feb. 11, 2008

(65) Prior Publication Data

US 2009/0199770 A1 Aug. 13, 2009

(51) Int. Cl.
*A01K 29/00* (2006.01)

(52) U.S. Cl. .................... 119/28.5; 119/771

(58) Field of Classification Search ............... 119/28.5, 119/482, 496, 771, 453, 452, 756; 5/94, 5/93.1; 297/473, 485, 250.1, 251–256, 256.1, 297/256.11, 256.12, 256.13, 256.14, 256.15, 297/256.16, 256.17; D30/108, 109, 118
See application file for complete search history.

(56) References Cited

U.S. PATENT DOCUMENTS

| | | | |
|---|---|---|---|
| D151,291 S | 10/1948 | Shoemaker | |
| 3,125,663 A * | 3/1964 | Hoffman | 219/217 |
| D245,716 S | 9/1977 | Russo | |
| D256,408 S | 8/1980 | Nakisbendi | |
| 4,597,359 A | 7/1986 | Moorman | |
| 5,275,464 A | 1/1994 | Eichhorn et al. | |
| 5,479,892 A | 1/1996 | Edwards | |
| 5,551,373 A | 9/1996 | O'Donnell | |
| 5,685,258 A | 11/1997 | Fricano | |
| 5,718,191 A | 2/1998 | O'Donnell | |
| D414,974 S | 10/1999 | Marrone | |
| D423,729 S | 4/2000 | Morgan | |
| 6,237,531 B1 | 5/2001 | Peeples et al. | |
| D461,966 S | 8/2002 | Reece | |
| 6,588,365 B2 | 7/2003 | Best Wright | |
| D528,706 S | 9/2006 | Jefferson | |
| 7,204,205 B2 | 4/2007 | O'Donnell | |
| 7,574,975 B2 * | 8/2009 | Kline | 119/28.5 |
| 2005/0284415 A1 * | 12/2005 | O'Donnell | 119/771 |
| 2008/0011234 A1 | 1/2008 | Wilkes | |

* cited by examiner

Primary Examiner—T. Nguyen
(74) Attorney, Agent, or Firm—Volpe and Koenig, PC

(57) ABSTRACT

A pet booster seat for seating a pet on a vehicle seat in an elevated position is provided. The pet booster seat includes a base and four walls projecting upwardly from the base to define a pet seating portion. An L-shaped lap section and a supporting portion each extend downwardly from the base to define a groove for receiving a lap-style seatbelt. The pet booster seat preferably includes a removable cushion, a heating element for heating the removable cushion, a removable cover, and a strap for attachment to a pet's collar or harness.

18 Claims, 10 Drawing Sheets

PET BOOSTER SEAT

FIELD OF INVENTION

The present invention relates to a booster seat for pets. Specifically, the present invention relates to a booster seat for seating a pet in an elevated position on a vehicle seat.

BACKGROUND

It is often desirable for pet owners to have their pets accompany them during travel. This may be for a variety of reasons, including the fact that the owner may not want to leave the pet in the home unattended, or that the experience of traveling together can be enjoyable for both the pet and the owner.

When traveling with a pet in an automobile, it is often desirable to restrain the pet so that it is not free to move about the vehicle, and is held generally in one location. This may be done for the safety of the pet as well as the driver and any passengers present in the automobile.

Cages and devices that completely enclose the pet are successful in preventing the pet from moving about the vehicle, but may cause unnecessary trauma or panic in pets not accustomed to being caged. Additionally, these devices may detract from the pet's enjoyment of riding in the vehicle. For that reason it is desirable to create a device that secures a pet to a section of an automobile without enclosing the pet in a small space.

Because modern vehicles are equipped with seatbelts, it is desirable to provide a device that secures a pet to a vehicle seat using a seatbelt. Most vehicles are equipped with both lap-style seatbelts which are secured across a person's lap, as well as shoulder harnesses which are secured diagonally across a person's chest. Additionally, the rear seating areas of many vehicles are equipped only with lap-belts. It would therefore be desirable to create a device that secures a pet to a vehicle seat using a lap-style seatbelt.

It would also be desirable to seat a pet in a raised position on a vehicle seat to permit the pet to view scenery outside the vehicle through the vehicle windows. At the same time, it is desirable for a seating device to have walls to help restrain the pet during sudden stops or in an accident.

Finally, it would be desirable to create a pet seating device that incorporates features that will maximize the pet's comfort during travel.

There are many prior art devices for restraining a pet in a moving vehicle. However, none of the prior art devices permit a pet to be secured in an elevated position in a vehicle seat using a lap style seatbelt while maximizing the pet's comfort.

SUMMARY

The present invention provides a pet booster seat that can be secured to a vehicle seat using a lap-style seatbelt, and provides for a pet's comfort during travel by allowing the pet to be in an elevated position while being restrained from totally free movement in the vehicle's interior.

The pet booster seat comprises a pet seating portion defined by a base and four surrounding walls. One of the four walls preferably includes a lowered section to permit entry and exit by the pet. An L-shaped lap section and a supporting section both extend downwardly from the base, together defining a groove through which a lap-style seatbelt is inserted to secure the pet booster seat to a vehicle seat.

The pet booster seat is preferably made of a soft foam material and includes a removable cushion. The pet booster seat may include a soft removable cover which is closable by a zipper, and the removable cushion may include a separate cover, also closable by a zipper. In one preferred embodiment, the cushion includes a heating element that receives energy through a cord adapted to engage in a vehicle cigarette lighter or auxiliary power point.

Preferably, the pet booster seat further comprises a strap for restraining the pet generally to the pet seating portion. One end of the strap may be attached to any part of the pet seating portion, or to the removable cover. The other end is attachable to a pet's collar or harness by a removable catch.

BRIEF DESCRIPTION OF THE DRAWING(S)

The foregoing Summary, as well as the following Detailed Description will be best understood when read in conjunction with the drawings which show a presently preferred embodiment. In the drawings.

DETAILED DESCRIPTION OF THE PREFERRED EMBODIMENT(S)

Figure 1:
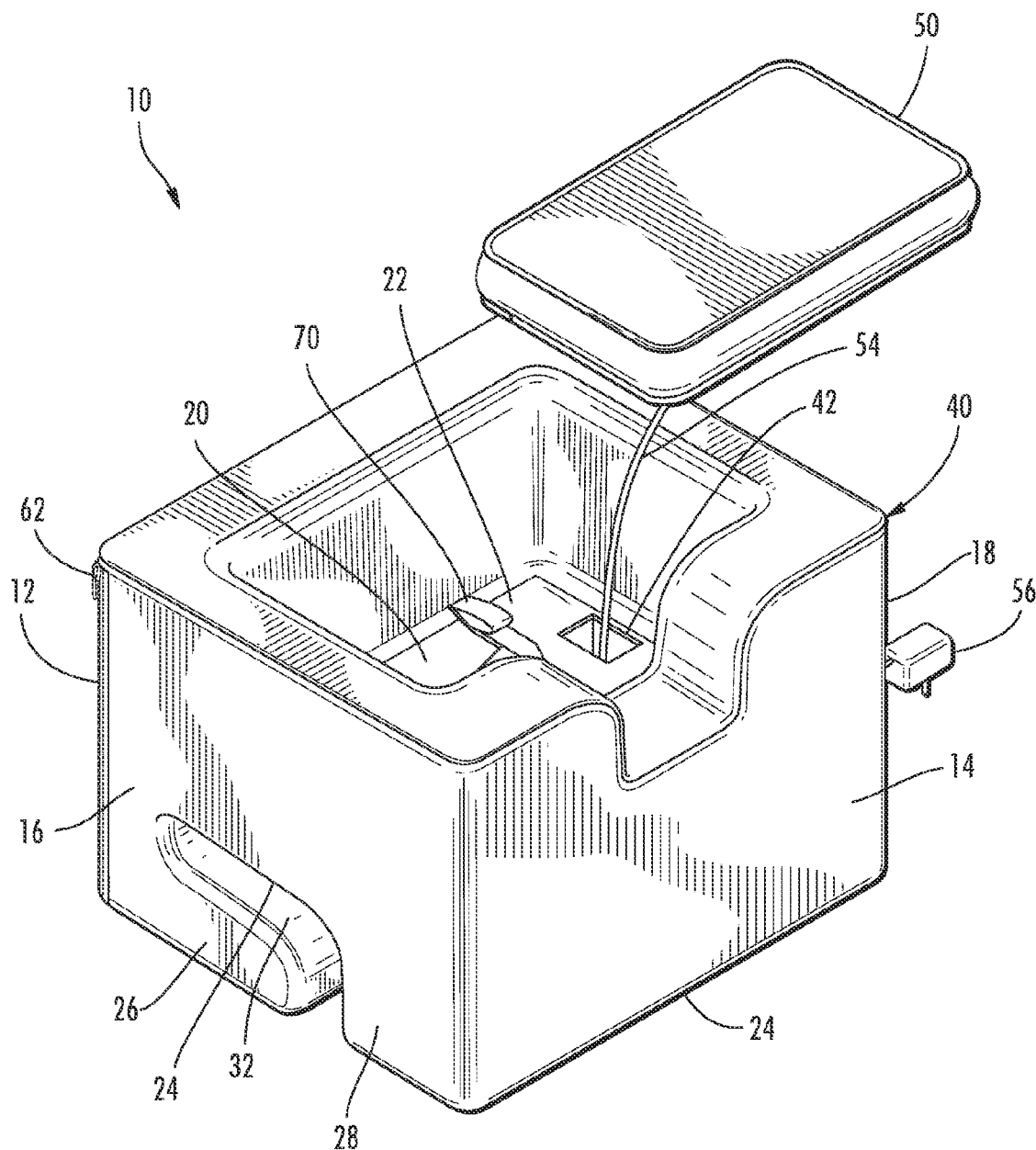
FIG. 1 is a perspective view of a preferred embodiment of the pet booster seat with the cushion removed.

Certain terminology is used in the following description for convenience only and is not considered limiting. Words such as "front," "back," "top," and "bottom" designate directions in the drawings to which reference is made. This terminology includes the words specifically noted above, derivatives thereof, and words of similar import. Additionally, the terms "a" and "one" are defined as including one or more of the referenced item unless specifically noted. The phrase "at least one of" followed by a list of two or more items, such as "A, B or C," means any individual one of A, B or C, as well as any combination thereof.

The preferred embodiments of the present invention are described below with reference to the drawing figures where like numerals represent like elements throughout.

Figure 2:
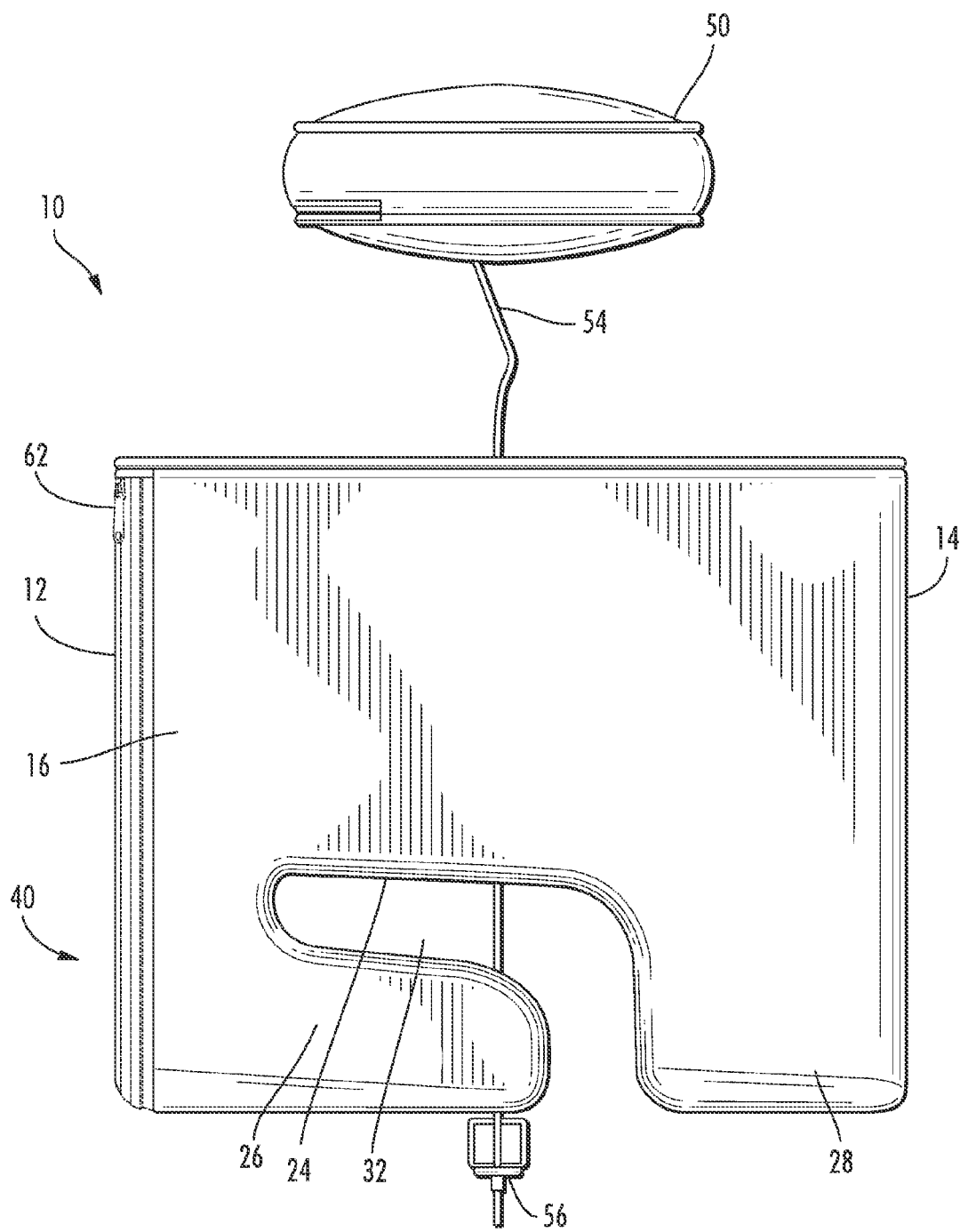
FIG. 2 is a side view of the pet booster seat shown in FIG. 1.
Figure 10:
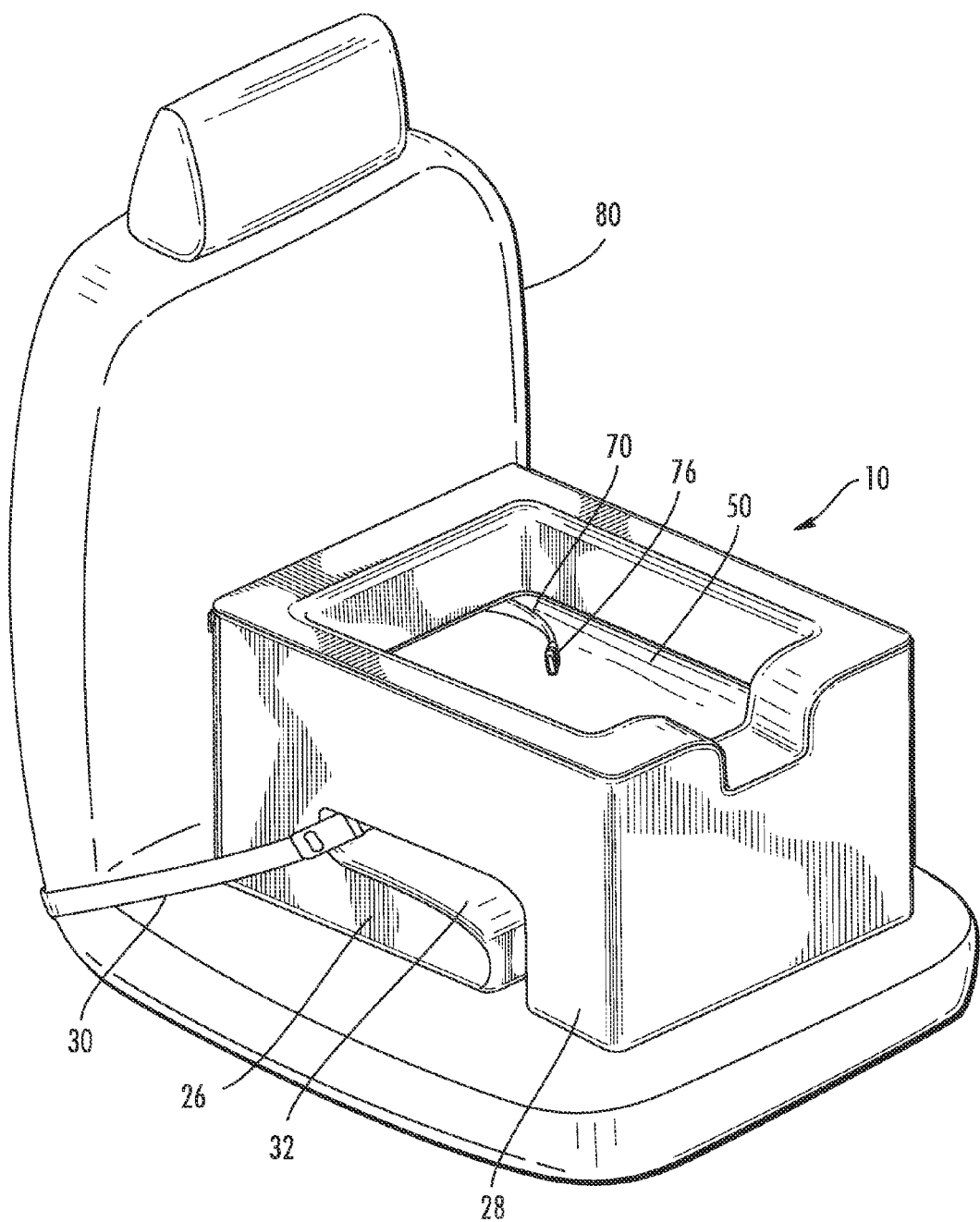
FIG. 10 is a perspective view of the pet booster seat installed on a vehicle seat.

Referring to FIGS. 1 and 2, the pet booster seat 10 comprises a base 20 having a top surface 22 and a bottom surface 24. A rear wall 12, a front wall 14, and first and second side walls 16, 18 each extend upwardly from the top surface of the base to define a pet seating portion 40. An L-shaped lap section 26 and a supporting portion 28 each extend downwardly from the base 20 to define a groove 32 for receiving a lap-belt. The groove 32 has an entry portion at the bottom of the pet booster seat 10, which transitions through a bend of at least 45°, and more preferably 60° to 120°, and most preferably at least about 90° to provide an enclosed area for the lap-belt to engage. As shown in FIG. 10, the pet booster seat 10 is secured to a vehicle seat 80 by engaging the lap-belt 30 through the groove 32 so that the lap-belt rests upon the L-shaped lap section 26, preferably the inside corner as shown in FIG. 10.

Figure 3:
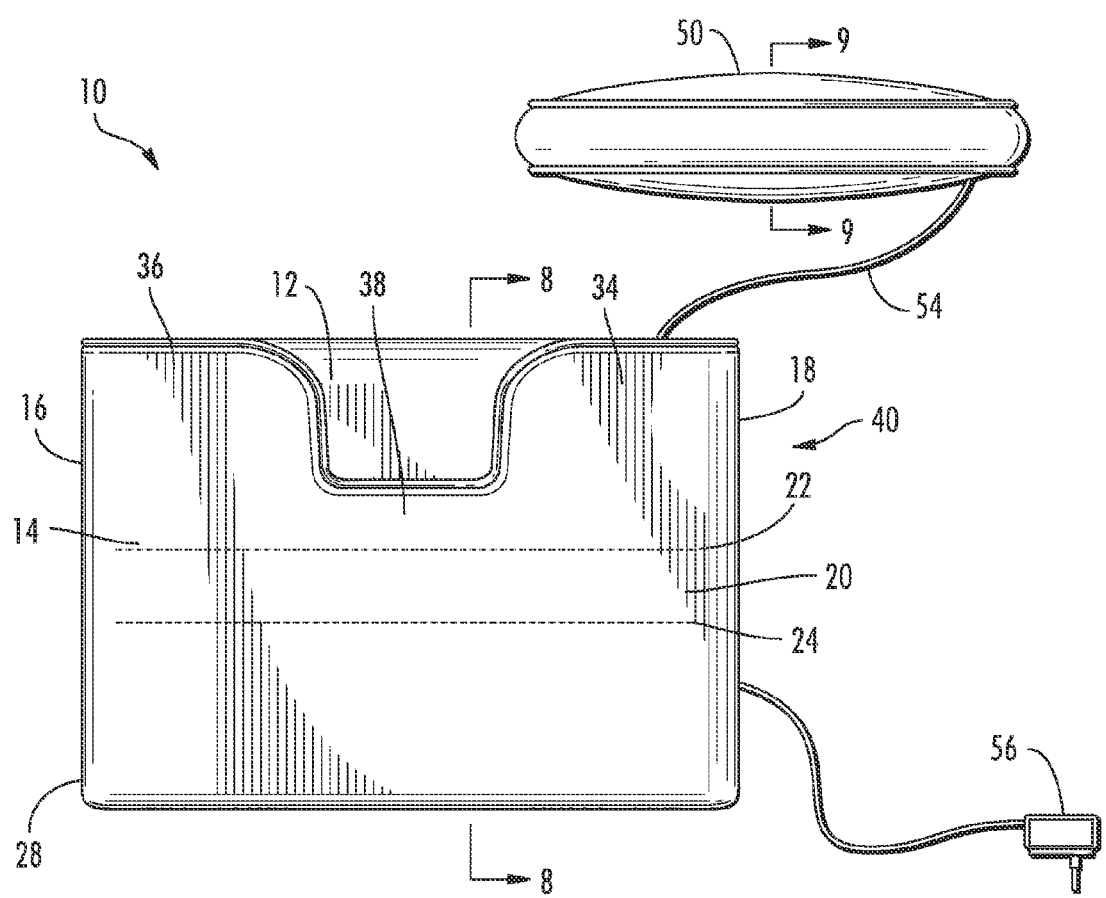
FIG. 3 is a front view of the pet booster seat shown in FIG. 1.
Figure 4:
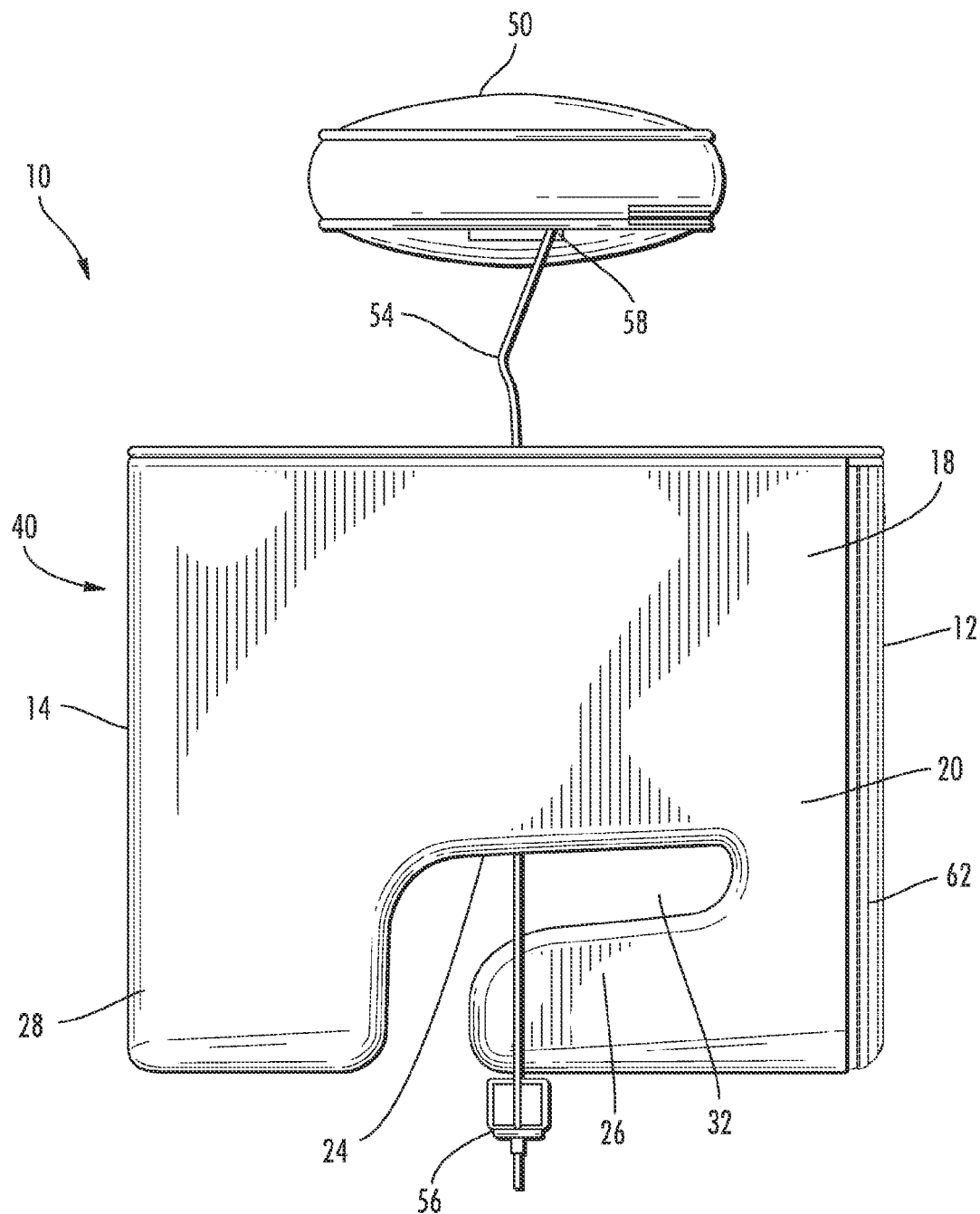
FIG. 4 is a side view of the pet booster seat shown in FIG. 1, shown from the opposite side of that in FIG. 2.

As shown in FIG. 3, the front wall 14 is preferably divided into a right section 34, a left section 36, and a middle section 38. The middle section 38 has a height less than that of the right and left sections 34, 36 to define an area for pet entry and exit. The height of the middle section 38 varies depending on the size and type of pet, but should be small enough to permit the pet to step in and out of the pet seating portion 40.

Figure 9:
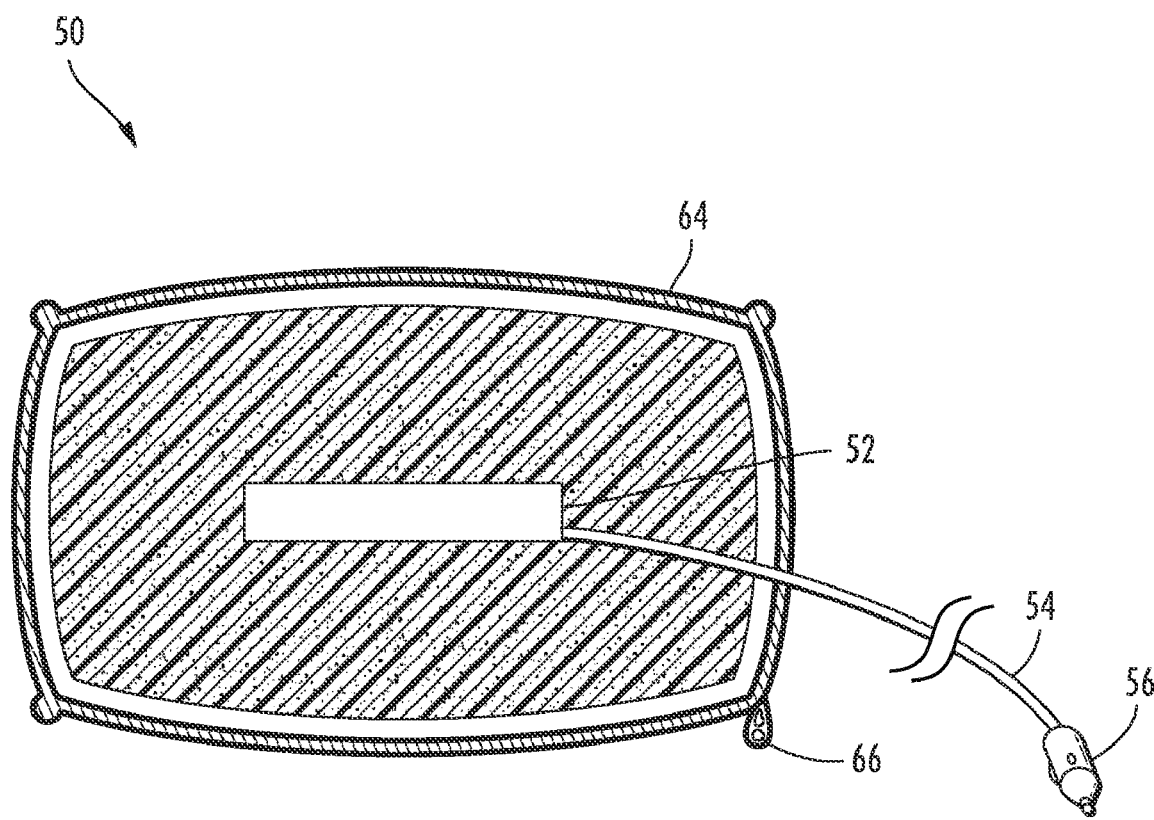
FIG. 9 is a cross sectional view of the removable cushion taken along line 9-9 in FIG. 3.

In the preferred embodiment shown in FIGS. 1-7, the pet booster seat comprises a removable cushion 50 located inside the pet seating portion 40. The removable cushion 50 preferably includes a heating element 52 for heating the cushion 50, as shown in FIG. 9. The heating element 52 is preferably an electrically powered resistance heating element which is supplied with electricity through a power cord 54 having an end connector 56 adapted to engage and receive energy from a vehicle cigarette lighter or auxiliary power point. The pet seating portion 40 preferably includes a hole 42 for the power cord to pass through. The hole 42 is preferably defined in the base 20, but may also be defined in the rear wall 12, front wall 14, or either of the side walls 16, 18. Alternatively, the removable cushion 50 could be affixed to or be formed as part of the base 20, and the heating element 52 could also be located in the base 20.

Figure 8:
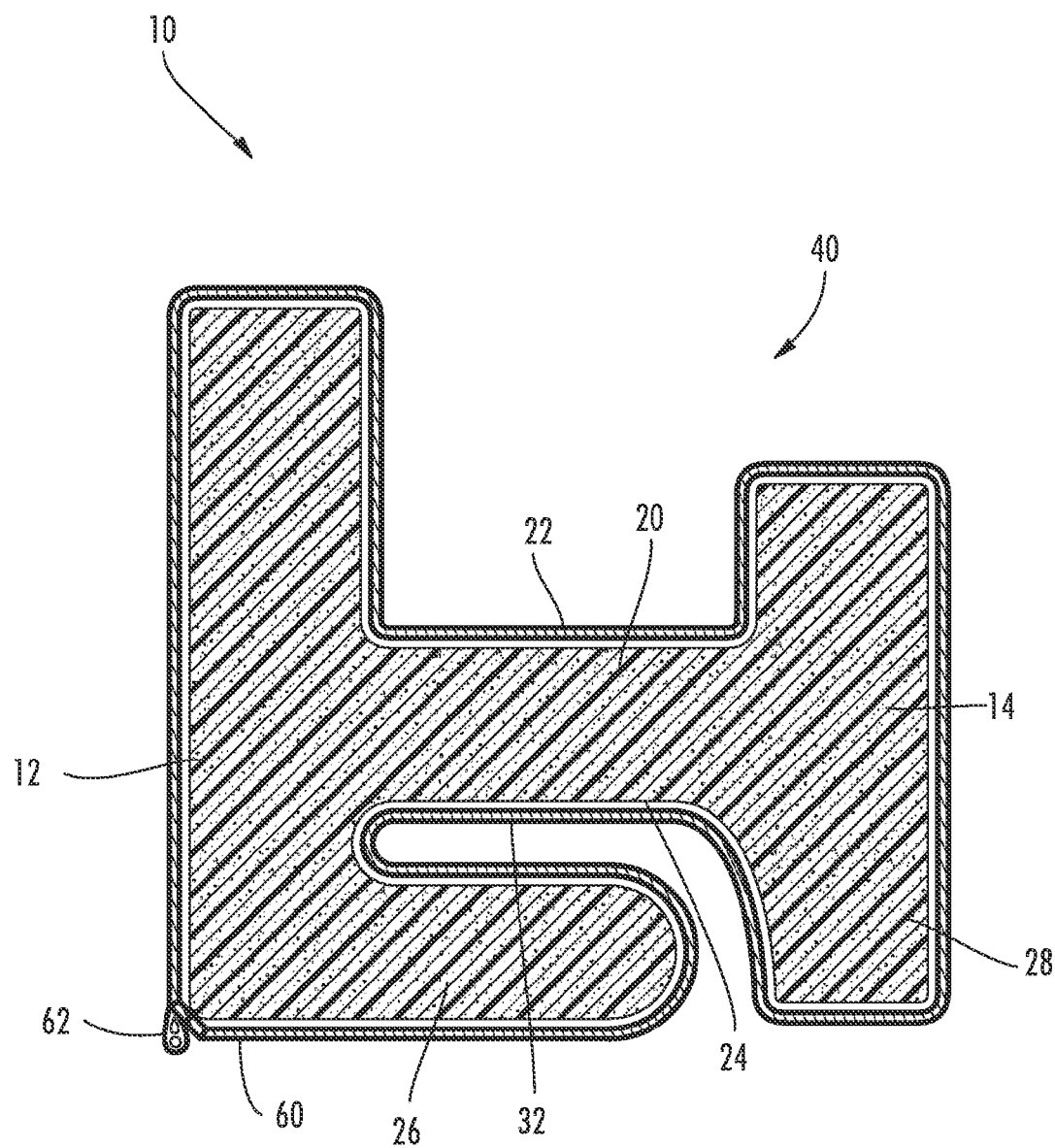
FIG. 8 is a cross sectional view of the pet booster seat taken along line 8-8 in FIG. 3.

As shown in FIG. 8 the pet booster seat 40 preferably comprises a removable cover 60. The removable cover 60 is shaped conform to the configuration of the pet booster seat 10, and may be secured on the pet booster seat 10 using various fastening devices, including a zipper 62, as shown in FIG. 8. The removable cushion 50 may include a separate removable cushion cover 64, which preferably is also secured using a zipper 66 and may include a hole 58 for passage of the power cord 54 if a heating element 52 is included. The removable covers 60, 64 can be made of various types of fabrics, and are preferably made of a soft fabric having a high level of durability. Suitable fabrics would easily be recognized by a person having ordinary skill in the art. In addition to zippers, it is also possible to use snaps, buttons, or hook and loop type textile fastening systems such as VELCRO® to attach the cover.

Figure 5:
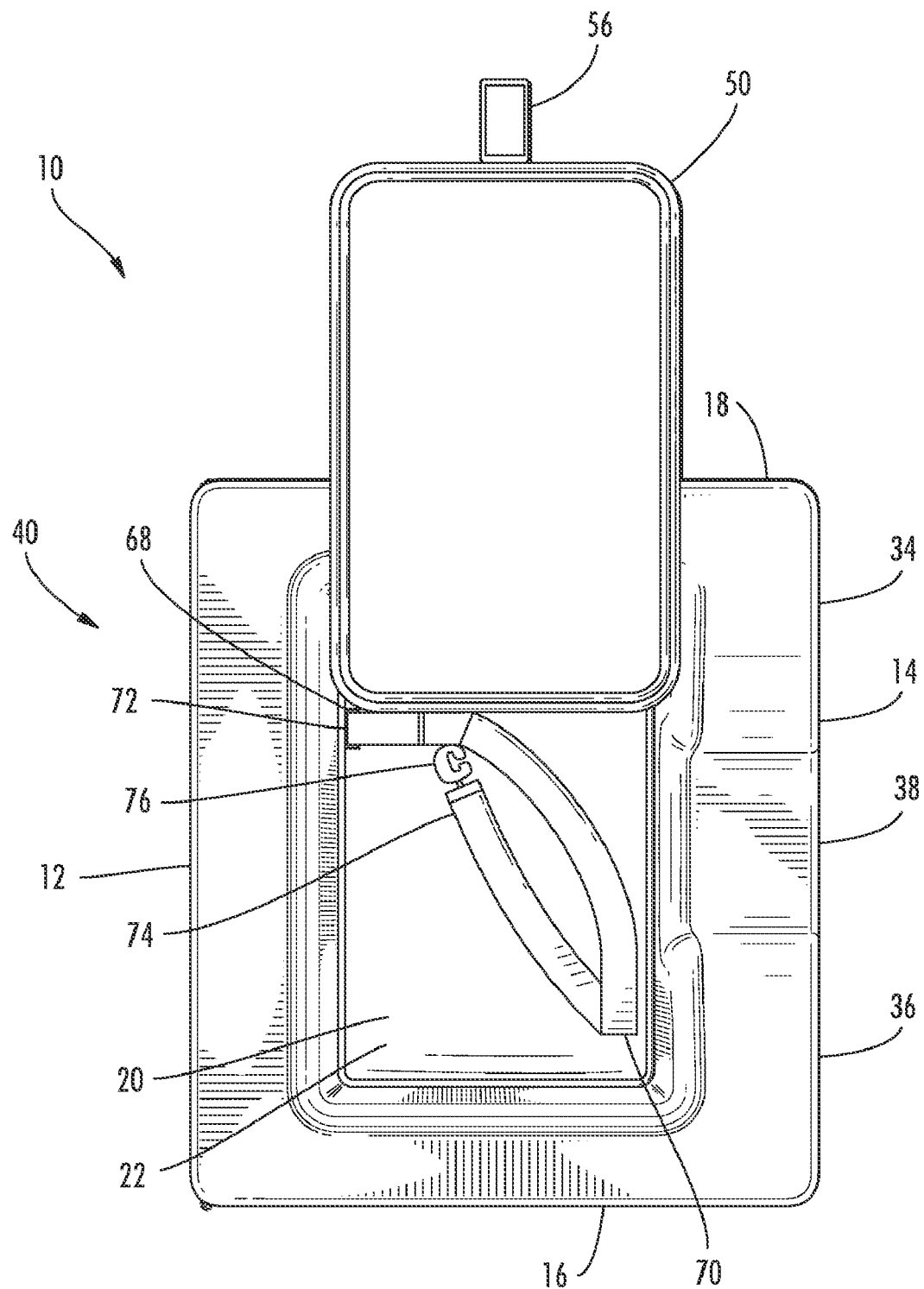
FIG. 5 is a top view of the pet booster seat shown in FIG. 1.
Figure 6:
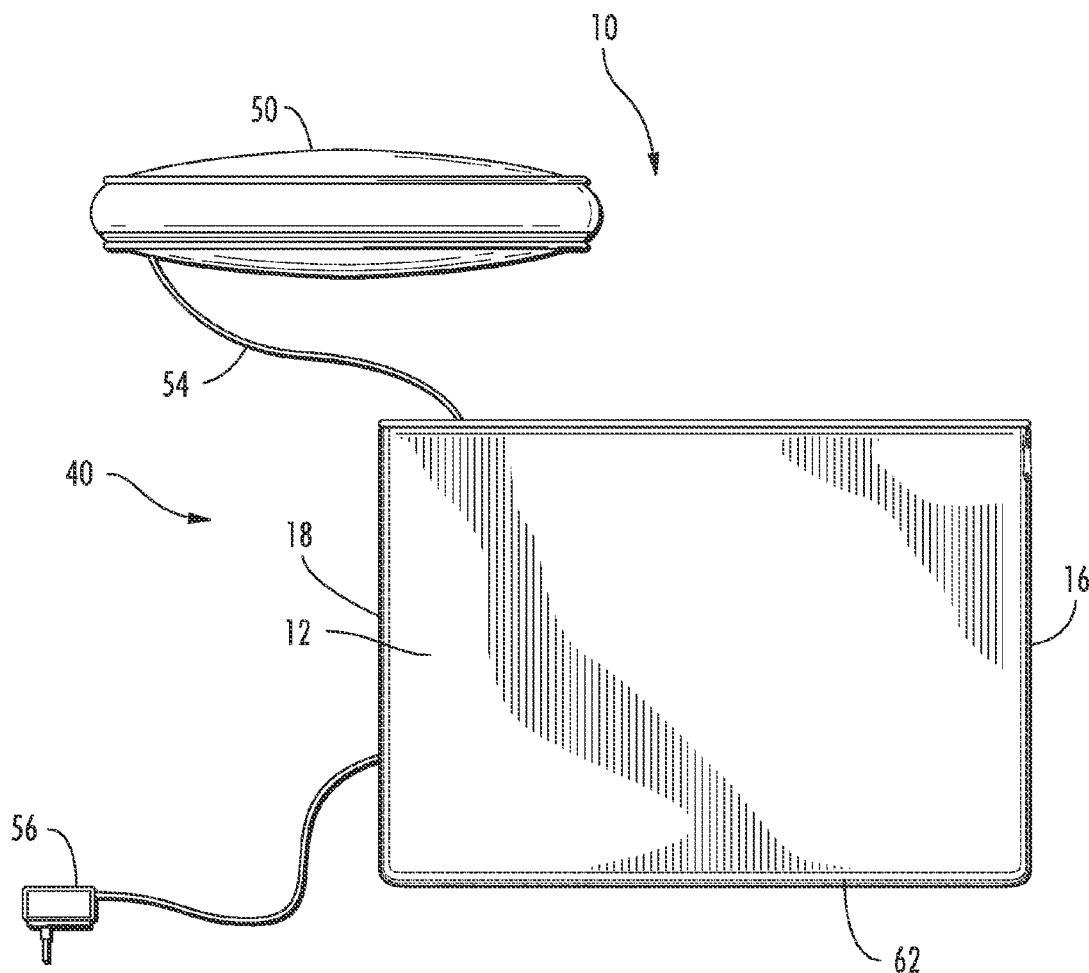
FIG. 6 is a rear view of the pet booster seat shown in FIG. 1.
Figure 7:
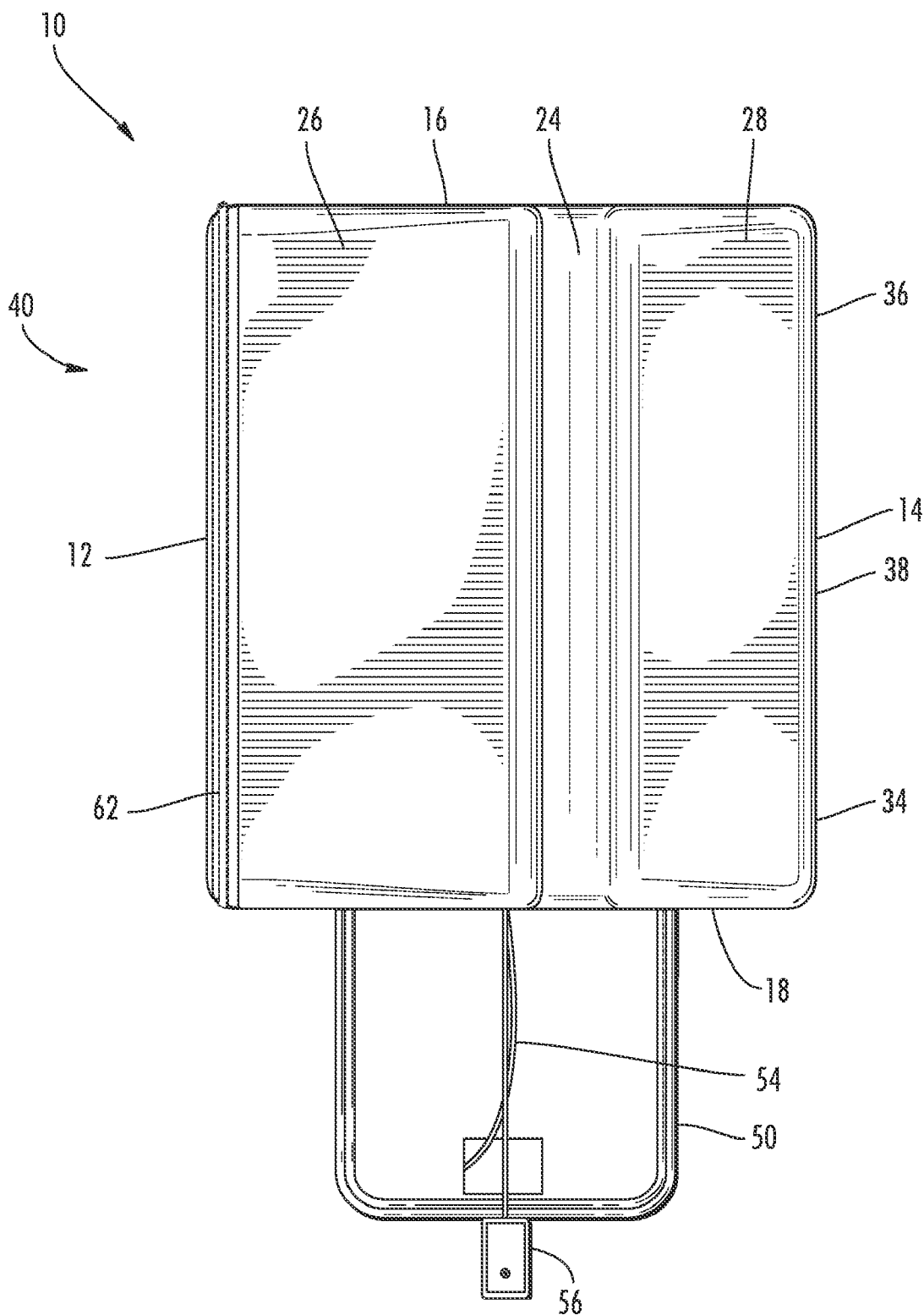
FIG. 7 is a bottom view of the pet booster seat shown in FIG. 1.

As shown in FIG. 5 the pet booster seat 10 preferably comprises a strap 70 for attachment to a pet's harness or collar. The strap 70 has a first end 72 and a second end 74. The first end 72 is attached to either the base 20, rear wall 12, front wall 14, either of the side walls 16, 18, or to a corresponding point on the removable cover 60, but is preferably attached to the top surface 22 of the base 20. If a removable cushion 50 is included, the first end 72 is preferably attached to the top surface 22 of the base 20 at a location beneath the removable cushion 50. If a removable cover 60 is included, the attachment may be made to the removable cover 60, or the removable cover 60 may define a hole 68 to permit passage of the strap 70. The attachment is preferably made using stitched thread, but may be made by other methods as well. The method of attachment to be used will depend upon the materials of which the strap 70, and pet booster seat 10 or removable cover 60 are made. The second end 74 of the strap 70 is attachable to a pet collar or harness, and preferably includes a removable catch 76 for this purpose. By attaching the second end 74 of the strap 70 to the pet collar or harness, a seated pet can be held generally in or in the area of the pet booster seat 10.

Preferably the base 20, rear wall 12, front wall 14, side walls 16, 18, L-shaped lap section 26 and supporting portion 28 of the pet booster seat 10 are formed of a soft foam material such as polyurethane foam or another elastic foam material and are preferably formed of a single piece of foam with the walls 12, 14, 16, 18, base 20, L-shaped lap section 26, and supporting portion 28 integrally connected together. However, the pet booster seat 10 is not limited to such materials, and other suitable materials would easily be recognized by a person having ordinary skill in the art.

While the preferred embodiments of the invention have been described in detail above, the invention is not limited to the specific embodiments described which should be considered as merely exemplary.

What is claimed is:

1. A pet booster seat for seating a pet on a vehicle seat in an elevated position, the pet booster seat comprising:
   a base having a top surface and a bottom surface, an L-shaped lap section and a supporting portion each extending downwardly from the bottom surface of the base, the supporting portion being separate from the L-shaped lap section and having a bottom surface aligned with a bottom surface of the L-shaped lap section, the L-shaped lap section and the supporting portion together defining a groove for receiving a lap-belt, to secure the pet booster seat on the vehicle seat;
   a front wall, a rear wall, and first and second side walls, each extending upwardly from the base which together define a pet seating portion.

2. The pet booster seat of claim 1, further comprising a removable cover having a zipper to facilitate closing of the removable cover over the booster seat.

3. The pet booster seat of claim 1, wherein the front wall comprises a right, left and center section, each of the right, left and center sections having a height, and the height of the center section is less than that of each of the left and right sections.

4. The pet booster seat of claim 1, further comprising a removable cushion located inside the pet seating portion.

5. The pet booster seat of claim 4, wherein the removable cushion comprises a removable cushion cover having a zipper to facilitate closing of the removable cushion cover over the removable cushion.

6. The pet booster seat of claim 4, wherein the removable cushion further comprises a heating element.

7. The pet booster seat of claim 6, wherein the heating element comprises an electrically powered heat generator having a power cord with an end connector adapted to engage in a vehicle cigarette lighter or a vehicle auxiliary power point.

8. The pet booster seat of claim 7, wherein at least one of the base, front wall, rear wall or first or second side walls includes a hole for passage of the cord.

9. The pet booster seat of claim 1, further comprising a strap having first and second ends, the second end includes a removable catch for attaching to at least one of a collar or harness.

10. The pet booster seat of claim 9, wherein the first end is attached to at least one of the base, the front wall, the rear wall or the first or the second side walls.

11. The pet booster seat of claim 10, further comprising a removable cover including a hole for passage of the strap.

12. The pet booster seat of claim 9, further comprising a removable cover, wherein the first end is attached to the removable cover.

13. The pet booster seat of claim 9, further comprising a removable cushion, the removable cushion being located inside the pet seating portion, the first end of the strap is attached to the top surface of the base at a location beneath the removable cushion.

14. The pet booster seat of claim 9, wherein the first end of the strap is attached by stitched thread to at least one of the base, the front wall, the rear wall or the first or the second side walls.

15. The pet booster seat of claim 1, wherein each of the L-shaped lap section, the supporting portion, the base, the front wall, the rear wall, and the first and the second side walls, comprise a foam material.

16. A pet booster seat for seating a pet on a vehicle seat in an elevated position, the pet booster seat comprising:
   a base having a top surface and a bottom surface;
   an L-shaped lap section and a separate supporting portion each extending downwardly from the bottom surface of the base, the L-shaped lap section and the supporting portion being formed integrally with the base and together defining a groove for receiving a lap-belt to secure the pet booster seat on the vehicle seat;
   a front wall, a rear wall, and first and second side walls, each extending upwardly from the base which together define a pet seating portion; and
   a removable cushion located inside the pet seating portion, the removable cushion including a heating element.

17. The pet booster seat of claim 16, wherein the heating element comprises an electrically powered heat generator having a power cord with an end connector adapted to engage in a vehicle cigarette lighter or a vehicle auxiliary power point.

18. The pet booster seat of claim 17, wherein at least one of the base, front wall, rear wall or first or second side walls includes a hole for passage of the cord.

* * * * *